(12) United States Patent
Ozeki et al.

(10) Patent No.: US 9,902,087 B2
(45) Date of Patent: Feb. 27, 2018

(54) POWDER FILLING DEVICE WITH REDUNDANT POWDER COLLECTION MECHANISM, AND ROTARY COMPRESSION MOLDING MACHINE

(71) Applicants: Sanwa Kagaku Kenkyusho Co., Ltd., Nagoya-shi (JP); Kikusui Seisakusho Ltd., Kyoto-shi (JP)

(72) Inventors: Yuichi Ozeki, Nagoya (JP); Kentaro Izumi, Nagoya (JP); Katsuhito Fujisaki, Kyoto (JP); Kouichi Atagi, Kyoto (JP)

(73) Assignee: Sanwa Kagaku Kenkyusho Co., Ltd., Nagoya-Shi (JP)

( * ) Notice: Subject to any disclaimer, the term of this patent is extended or adjusted under 35 U.S.C. 154(b) by 775 days.

(21) Appl. No.: 14/348,146

(22) PCT Filed: Oct. 3, 2012

(86) PCT No.: PCT/JP2012/006357
§ 371 (c)(1),
(2) Date: Mar. 28, 2014

(87) PCT Pub. No.: WO2013/051262
PCT Pub. Date: Apr. 11, 2013

(65) Prior Publication Data
US 2014/0234463 A1    Aug. 21, 2014

(30) Foreign Application Priority Data
Oct. 4, 2011    (JP) .................................. 2011-219913

(51) Int. Cl.
*B29B 17/00*    (2006.01)
*B29C 43/34*    (2006.01)
(Continued)

(52) U.S. Cl.
CPC .......... *B29B 17/0005* (2013.01); *B29C 43/34* (2013.01); *B30B 11/08* (2013.01); *B30B 15/0082* (2013.01); *B30B 15/302* (2013.01)

(58) Field of Classification Search
CPC ..................................................... B29C 43/085
See application file for complete search history.

(56) References Cited

U.S. PATENT DOCUMENTS

| | | | |
|---|---|---|---|
| 4,373,820 A * | 2/1983 | Browning | B01F 13/0294 366/101 |
| 2003/0070903 A1 | 4/2003 | Sowden et al. | |
| 2006/0214335 A1* | 9/2006 | Cox | B01F 3/188 264/497 |

FOREIGN PATENT DOCUMENTS

| | | |
|---|---|---|
| EP | 1270464 A1 | 1/2003 |
| JP | 56139752 A | 10/1981 |

(Continued)

OTHER PUBLICATIONS

Internation preliminary report on patentability WO2013/051262 (English translation of written opinion of the international searching authority, from WIPO patentscope site).*

(Continued)

*Primary Examiner* — Matthew Daniels
*Assistant Examiner* — Kimberly A Stewart
(74) *Attorney, Agent, or Firm* — Shumaker, Loop & Kendrick, LLP

(57) ABSTRACT

Disclosed is a powdery material filling device with a redundant (i.e., excess or waste) powdery material recovering mechanism. The powdery material filling device may be used in a rotary compression molding machine. In certain aspects, the redundant powdery material recovering mechanism is capable of actively recovering and reusing a redun- (Continued)

dant (i.e., excess or waste) powdery material even upon production of multi-layer tablets.

13 Claims, 5 Drawing Sheets

(51) Int. Cl.
*B30B 11/08* (2006.01)
*B30B 15/30* (2006.01)
*B30B 15/00* (2006.01)

(56) References Cited

FOREIGN PATENT DOCUMENTS

| JP | 635900 A | 1/1988 | | |
|----|----------|--------|---|---|
| JP | 3008368 U | 12/1994 | | |
| JP | 947900 A | 2/1997 | | |
| JP | H09-047900 | * | 2/1997 | ............. B30B 11/08 |
| JP | H10-099998 A | 4/1998 | | |
| JP | 2006212702 A | 8/2006 | | |
| WO | 03028618 A2 | 4/2003 | | |
| WO | 2004037469 A1 | 5/2004 | | |

OTHER PUBLICATIONS

Supplementary European Search Report EP 12 83 8134, dated Dec. 10, 2015, (10 pages).
International Search Report dated Dec. 25, 2012 for Corresponding International Application No. PCT/JP2012/006357.

* cited by examiner (a)

(b)

(c)

(d)

(E)

(a)

(b)

(c)

(d)

(e)

POWDER FILLING DEVICE WITH REDUNDANT POWDER COLLECTION MECHANISM, AND ROTARY COMPRESSION MOLDING MACHINE

CROSS-REFERENCE TO RELATED APPLICATIONS

This application claims priority to Japanese Patent Application No. 2011-219913 filed in Japan on Oct. 4, 2011 and to PCT/JP2012/006357 filed on Oct. 3, 2012, the entire disclosures of which are hereby incorporated by reference in their entirety.

TECHNICAL FIELD

The invention relates to a powdery material filling device provided with a redundant (i.e., excess or waste) powdery material recovering mechanism for use in a rotary compression molding machine having a rotating die table provided with a plurality of dies, and upper punches and lower punches located above and below the dies respectively, wherein the dies are filled with powdery material and then the upper punches and the lower punches compress and mold the filled powdery material in the dies sequentially while the dies, the upper punches, and the lower punches are being rotated along with the rotating die table. The invention also relates to the rotary compression molding machine having the filling device.

BACKGROUND

Non-Patent Document 1 depicts a gravity feeder in FIG. 7.40 and describes "In order to achieve uniform filling, empirically known is that it is important to appropriately set a ratio of a new material and an old material having circulated in a feeder and uniformly mix these materials." It is well known that mixing a material leaked out of a die onto a rotating die table and recovered with a new material (powdery material) and uniformizing these materials are important in tableting by compression molding.

This document never describes specifically how to recover the material and how to uniformly mix the new material and the recovered material. In other words, Non-Patent Document 1 fails to describe any specific recovering means and any uniformly mixing means. Furthermore, on the basis of the expression "circulated", the technique described in Non-Patent Document 1 can be regarded as being applicable to a case where, in the rotary compression molding machine, a single type of powdery material is supplied and compressed and as being related to a common technique for circulating the single type of powdery material and recovering the powdery material on a rotating die table.

In a case where there are a plurality of powdery material supply devices in order to produce multi-layer tablets or multi-layer products, such a technique is not applicable to the means for circulating a powdery material and recovering the powdery material on a rotating die table because a plurality of powdery materials are mixed together.

Patent Document 1 relates to the invention of "a shoe box in a powdery material molding device" and clearly discloses a method of sucking and recovering a powdery material leaked out of the shoe box (i.e., feed shoe) corresponding to the powdery material filling device in this application. Such recovery by suction, in other words, the method using air causes segregation of particles configuring a powdery material due to particle diameters or specific gravity. This method is not applicable to a case where segregation seriously influences the quality such as non-uniformity of medicinal properties contents (drug contents) as in mixed powdery materials used for molding tablets containing medicinal properties.

Patent Document 2 relates to the invention of "a method and device of molding a powdery material" and describes, in FIG. 3 for example, a method of returning an unnecessary pre-molded product directly to a cavity (corresponding to a "feeder" in this application) by operating a powdery material returning pusher. However, this document does not relate to recovery of a leaked powdery material but merely describes pushing the pre-molded product in a conventional technique so as to return the pre-molded product again into the feeder with the push force. When the pre-molded product is returned directly, a molded product is molded again from a material including a powdery material and the pre-molded product mixed together. In this case, it is impossible to achieve homogenization and prevent segregation of the powdery material.

As described above, all of these conventional techniques relate to compression molding of a single type of powdery material and are not applicable to a case where a rotary compression molding machine having a plurality of feeders produces a molded product by compressing and molding a plurality of types of powdery materials.

PRIOR ART DOCUMENTS

Patent Documents

Patent Document 1: JP 5-5102 A
Patent Document 2: JP 2000-71099 A (FIG. 3)

Non-Patent Document

Non-Patent Document 1: "Powder Compression Molding Technology", Edited by Division of Particulate Preparation and Design, The Society of Powder Technology, Japan, Published by Nikkan Kogyo Shimbun Ltd., Jun. 30, 1998 (pp. 304-305)

SUMMARY OF THE INVENTION

Thus, it is an object thereof to provide a powdery material filling device provided with a redundant (i.e., excess or waste) powdery material recovering mechanism and a rotary compression molding machine having the filling device. The filling device is capable of actively recovering and reusing a redundant powdery material even upon production of multi-layer tablets in which powdery material in different layers must not be mixed.

The invention is made by appropriately combining any of the following configurations, though some may not be used.

A powdery material filling device provided with a redundant (i.e., excess or waste) powdery material recovering mechanism for use in a rotary compression molding machine having a rotating die table provided with a plurality of dies, and upper punches and lower punches located above and below the dies respectively, wherein the dies are filled with powdery material and then the upper punches and the lower punches compress and mold the filled powdery material in the dies sequentially while the dies, the upper punches, and the lower punches are being rotated along with the rotating die table, the device comprising: a powdery material filling unit for filling the dies with powdery material; a redundant powdery material recovering unit located around downstream of the powdery material filling unit, for separating and recovering, from the surface of the rotating die table, a powdery material leaked out of the powdery material filling unit and the dies onto the rotating die table; a redundant powdery material conveying unit capable of conveying the redundant powdery material recovered by the redundant powdery material recovering unit quasi-continuously in a predetermined constant amount of conveyance; a new powdery molding material supplying unit for supplying the powdery material filling device with a new powdery molding material; a pre-mixed powdery material reserving unit connected to the new powdery molding material supplying unit and the redundant powdery material conveying unit, for temporarily reserving the new powdery molding material supplied from the new powdery molding material supplying unit and the redundant powdery material conveyed by the redundant powdery material conveying unit; and a powdery material mixing unit for mixing and substantially homogenizing (i.e., uniform) the new powdery molding material and the redundant (i.e., excess or waste) powdery material transferred from the pre-mixed powdery material reserving unit, wherein the powdery material filling unit fills the dies with the powdery materials that is mixed and substantially homogenized (i.e., uniform) in the powdery material mixing unit.

The powdery material filling device may be provided with the redundant powdery material recovering mechanism, wherein at least one of the redundant powdery material recovering unit and the redundant powdery material conveying unit has an overflown powdery material discharger for discharging an overflown redundant powdery material from the device.

The powdery material filling device may be provided with the redundant powdery material recovering mechanism, wherein the redundant powdery material conveying unit is located outside the rotating die table.

The powdery material filling device may be provided with the redundant powdery material recovering mechanism, wherein the redundant powdery material conveying unit has a tube-like structure or a gutter-like structure.

The powdery material filling device may be provided with the redundant powdery material recovering mechanism, wherein the redundant powdery material conveying unit is a conveyer or a spiral conveying machine having a screw in a tube-like structure.

The powdery material filling device may be provided with the redundant powdery material recovering mechanism, wherein the new powdery molding material supplying unit, the pre-mixed powdery material reserving unit, the powdery material mixing unit, and the powdery material filling unit are located in this order from the top of the powdery filling device to the bottom of the powdery filling device.

The powdery material filling device may be provided with the redundant powdery material recovering mechanism, wherein the powdery material mixing unit and the powdery material filling unit are configured integrally.

The powdery material filling device may be provided with the redundant powdery material recovering mechanism, wherein the pre-mixed powdery material reserving unit and the powdery material mixing unit are configured integrally.

The powdery material filling device may be provided with the redundant powdery material recovering mechanism, wherein the powdery material mixing unit has a rotary blade for agitating the powdery material.

The powdery material filling device may be provided with the redundant powdery material recovering mechanism, wherein the powdery material filling unit has a rotary blade or a ladder-like stepped portion.

The powdery material filling device may be provided with the redundant powdery material recovering mechanism, wherein the redundant powdery material recovering unit is a scraper made of a material having hardness less than that of the rotating die table.

The powdery material filling device may be provided with the redundant powdery material recovering mechanism, wherein at least one of the pre-mixed powdery material reserving unit, the powdery material mixing unit, and the powdery material filling unit includes a powdery material level sensor for constantly controlling an amount of the new powdery molding material supplied from the new powdery molding material supplying unit.

The powdery material filling device may be provided with the redundant powdery material recovering mechanism, wherein the amount of conveyance by the redundant powdery material conveying unit can be regulated.

The powdery material filling device may be provided with the redundant powdery material recovering mechanism, wherein the amount of conveyance by the redundant powdery material conveying unit is set in accordance with an amount of the redundant (i.e., excess or waste) powdery material recovered by the redundant powdery material recovering unit.

In certain aspects, the rotary compression molding machine includes a rotating die table provided with a plurality of dies, and upper punches and lower punches located above and below the dies respectively, wherein the dies are filled with powdery material and then the upper punches and the lower punches compress and mold the filled powdery material in the dies sequentially while the dies, the upper punches, and the lower punches are being rotated along with the rotating die table, the machine having at least one powdery material filling device provided with the redundant powdery material recovering mechanism according to the invention.

The invention achieves active recovery and reuse of a redundant powdery material even upon production of molded products from a plurality of powdery materials using a rotary compression molding machine provided with a plurality of feeders. The completed molded products have almost no variation in quality because the molded products can be produced from powdery materials in which a new powdery material and a redundant powdery material are mixed substantially uniformly. More specifically, the powdery material filling device provided with a redundant powdery material recovering mechanism according to the invention is capable of actively recovering and reusing the redundant powdery material even upon production of multi-layer tablets in each of which powdery materials in different layers must not be mixed.

In the rotary compression molding machine according to the invention, a powdery material is filled in a die using the powdery material filling device provided with the redundant powdery material recovering mechanism according to the invention. The effects of the filling device are thus achieved in the compression molding machine.

DETAILED DESCRIPTION

An embodiment of the invention is described below with reference to the accompanying drawings. The invention is not limited to the following embodiment but includes various combinations of any of examples. The invention can be embodied with free modification within the scope of the description as well as the scope of common technical knowledge.

Figure 1:
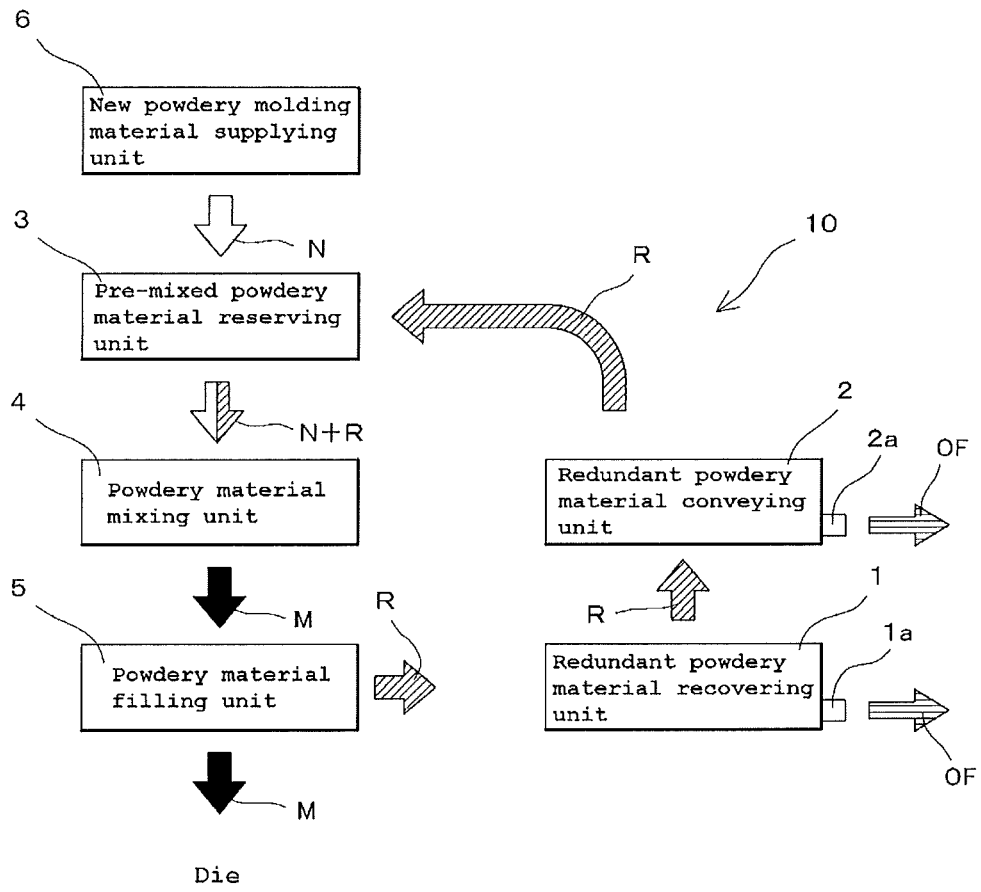
FIG. 1 is a flowchart showing a flow of powdery materials in an exemplary powdery material filling device provided with a redundant powdery material recovering mechanism according to the invention.

FIG. 1 is a flowchart showing a flow of powdery materials in an exemplary filling device provided with a redundant powdery material recovering mechanism according to the invention. FIG. 1 shows a powdery material filling device 10 provided with a redundant (i.e., excess or waste) powdery material recovering mechanism. The filling device 10 is included in a rotary compression molding machine (of which configuration is to be detailed later), having a rotating die table provided with a plurality of dies, and upper punches and lower punches located above and below the dies respectively, wherein the dies are filled with powdery material and then the upper punches and the lower punches compress and mold the filled powdery material in the dies sequentially while the dies, the upper punches, and the lower punches are being rotated along with the rotating die table. The powdery material indicates collective solid fine substances, and conceptually includes so-called granules or powdered substances smaller than grains.

The powdery material filling device 10 provided with the redundant powdery material recovering mechanism includes a powdery material filling unit 5 for filling the dies with powdery material, a redundant powdery material recovering unit 1 located around downstream of the powdery material filling unit 5, for separating and recovering, from the surface of the rotating die table, a redundant powdery material R leaked out of the powdery material filling unit 5 and the dies onto the rotating die table, and a redundant powdery material conveying unit 2 capable of conveying the redundant (i.e., excess or waste) powdery material R recovered by the redundant powdery material recovering unit 1 quasi-continuously in predetermined constant amount of conveyance. The redundant powdery material conveying unit 2 conveys the constant conveyance amount of the recovered redundant powdery material R to a pre-mixed powdery material reserving unit 3 to be described later.

The device 10 further includes a new powdery molding material supplying unit 6 for supplying the device 10 with a new powdery molding material N, the pre-mixed powdery material reserving unit 3 connected to the new powdery molding material supplying unit 6 and the redundant powdery material conveying unit 2, for temporarily reserving the new powdery molding material N supplied from the new powdery molding material supplying unit 6 and the redundant powdery material R conveyed by the redundant powdery material conveying unit 2, and a powdery material mixing unit 4 for mixing the new powdery molding material N transferred from the pre-mixed powdery material reserving unit 3 and the redundant powdery material R to substantially homogenize the powdery materials. The powdery material filling unit 5 fills the dies with a mixed powdery material M that is obtained by substantially uniform mixing at the powdery material mixing unit 4.

The entire powdery material filling device 10 provided with the redundant powdery material recovering mechanism is configured and characterized as described above. In FIG. 1, the redundant powdery material leaked out of the powdery material filling unit 5 is denoted by reference sign R. The redundant powdery material R is different in precise physical properties from the original powdery material due to external influence while being recovered by the redundant powdery material recovering unit 1. The redundant powdery material R before being recovered by the redundant powdery material recovering unit 1 is thus similar in physical properties to the mixed powdery material M. The respective units of the powdery material filling device provided with the redundant powdery material recovering mechanism according to the invention are to be described in more detail.

The redundant powdery material recovering unit 1 initially separates and recovers, from the rotating die table, the redundant powdery material R leaked out of the powdery material filling unit 5 and the dies onto the rotating die table. In other words, the redundant powdery material recovering unit 1 leaves the redundant powdery material R on the rotating die table as less as possible. Even in a case where a plurality of powdery material filling devices are provided on the rotating die table in order to produce multi-layer tablets or the like, a redundant powdery material from one of the powdery material filling devices is thus prevented from being mixed with a powdery material supplied from a different one of the powdery material filling devices.

The redundant (i.e., excess or waste) powdery material recovering unit 1 can be provided as a scraper. The scraper is preferably made of a material having hardness less than that of a rotating die table 103 so as not to damage the rotating die table 103. Preferable examples of such a material of less hardness include metal, as well as hard plastic and vulcanized fiber.

The redundant powdery material can also be recovered not with the scraper but using air (air compression and/or suction). The latter method is not preferred in terms of substantial homogenization of the finally mixed powdery material because the powdery material is separated and segregated. This method is not to be excluded if the powdery material does not cause such a problem.

It is hard to completely recover the redundant (i.e., excess or waste) powdery material R from the rotating die table only with the redundant powdery material recovering unit 1. In order to remove the redundant powdery material slightly left on the rotating die table, a dust collector 8 (see FIG. 5) of an air supply and suction type using air can be provided on the rotating die table and immediately downstream of the redundant powdery material recovering unit 1. The dust collector 8 is capable of almost completely removing the redundant powdery material R on the rotating die table. The dust collector 8 of the air supply and suction type jets compressed air and/or sucks to remove the redundant powdery material slightly left on the rotating die table. The redundant powdery material thus removed is usually disposed and is not reused.

The redundant powdery material R separated and recovered by the redundant powdery material recovering unit 1 is received by the redundant powdery material conveying unit 2 along with rotation and the like of the rotating die table. Instead of directly feeding redundant (i.e., excess or waste) powdery material conveying unit 2 with the redundant powdery material R, a redundant powdery material reserving unit 9 (not shown) can be provided so that the redundant powdery material R is once reserved therein and is then received by the redundant powdery material conveying unit 2. In this case, the redundant powdery material reserving unit 9 may be provided as a simple path from the redundant powdery material recovering unit 1 to the redundant powdery material conveying unit 2.

The redundant powdery material conveying unit 2 then quasi-continuously conveys a predetermined constant conveyance amount of the redundant powdery material R recovered by the redundant powdery material recovering unit 1. The conveyance amount of the redundant powdery material can be also expressed as a convey speed. The predetermined constant conveyance amount is set for each of used powdery materials on the basis of a measured amount of each of the redundant powdery materials leaked out of the powdery material filling unit and the dies onto the rotating die table. In the device according to the invention, an amount of the redundant powdery material conveyed by the redundant powdery material conveying unit 2 is preferably regulatable.

If the constant conveyance amount of the redundant (i.e., excess or waste) powdery material thus recovered is not conveyed continuously, the mixture ratio of the new powdery molding material and the recovered redundant powdery material is varied. The conveyance amount is thus set within a range not exceeding the recovering amount (speed) of the redundant powdery material that is leaked out of the powdery material filling unit and the dies onto the rotating die table and is recovered. If the conveyance amount exceeds the recovering amount (speed) of the redundant powdery material, the redundant powdery material to be conveyed may not be enough and the mixture ratio of the new powdery molding material and the recovered redundant powdery material is varied. When the conveyance amount is set within the range not exceeding the recovering amount (speed) of the redundant powdery material, the recovered redundant powdery material is gradually reserved.

In order to reserve the redundant powdery material in this manner, at least one of the redundant (i.e., excess or waste) powdery material recovering unit 1 and the redundant (i.e., excess or waste) powdery material conveying unit 2 according to this embodiment has overflown powdery material dischargers 1a and 2a for discharging an overflown redundant powdery material (overflow) OF from the device. These dischargers are not essential but prevent overflow and scatter of the redundant powdery material gradually reserved. The overflown powdery material dischargers can be alternatively provided at the redundant powdery material reserving unit 9. The redundant powdery material reserving unit 9 increased in size can also deal with overflow of the redundant powdery material for a certain period of time.

The redundant powdery material conveying unit 2 is not particularly limited in terms of its location, but is located outside the rotating die table. More specifically, the redundant powdery material recovering unit 1 collects the redundant powdery material leaked out of the powdery material filling unit 5 and the dies onto the rotating die table so as to be removed outside from the rotating die table, and the redundant powdery material conveying unit 2 located outside the rotating die table receives and conveys the redundant powdery material thus recovered. The redundant powdery material conveying unit 2 can be thus located horizontally closest to the powdery material filling unit 5. This configuration leads to decrease in length of a conveyance path of the redundant powdery material conveying unit 2 itself and reduction in size of the entire rotary compression molding machine that includes the device according to the invention.

"Conveying quasi-continuously" by the redundant powdery material conveying unit 2 includes continuous conveyance using a conveying unit, a spiral conveyance pipe, or the like. It further includes a method of conveying by a constant unit volume using a bucket, a container, or the like, more specifically, a batch conveyance method of a degree not influencing mixing of the new powdery molding material and the redundant powdery material at a constant ratio and substantial homogenization at the downstream powdery material mixing unit 4. Conveying quasi-continuously still further includes a conveyance method that does not influence segregation and composition of the powdery material. This case applies to a conveying device shown in each of FIGS. 2(a) to 2(e) and to be described later.

More specifically, any of these methods eventually achieves mixture and substantial homogenization of the new powdery molding material N and the redundant powdery material R by the powdery material mixing unit 4, supply of the substantially uniform mixed powdery material M to the powdery material filling unit 5, filling of the mixed powdery material M of substantially uniform quality with use of the redundant powdery material R, and tableting of molded products of substantially uniform quality.

The redundant (i.e., excess or waste) powdery material conveying unit 2 is not limited to those shown in FIGS. 2(a) to 2(e) in its specific configuration but may employ any other conveyance method, as long as it is capable of achieving quasi-continuous conveyance, conveyance by the predetermined constant conveyance amount, and substantial homogenization of the mixed powdery material. A conveyance method using air (air compression and/or suction) is, however, not preferred in terms of substantial homogenization of the finally obtained mixed powdery material because such a method causes the powdery material to be separated and segregated. This method is not to be excluded if the powdery material does not cause such a problem.

Figure 2:
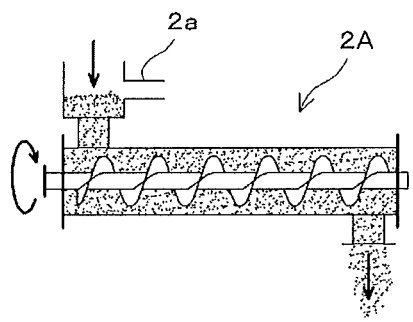
FIGS. 2(a) to 2(e) are views exemplifying redundant powdery material conveying units according to various aspects of the invention.
Figure 2:
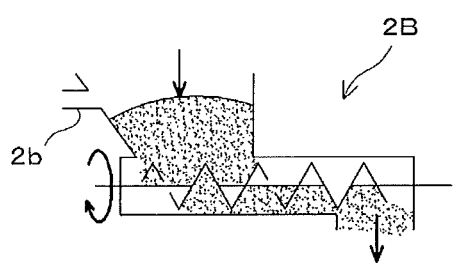
Figure 2:
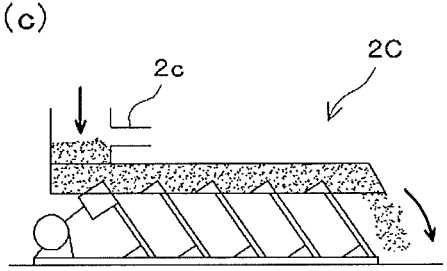
Figure 2:
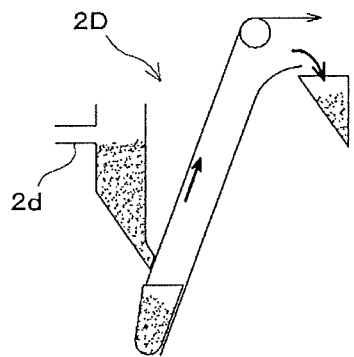
Figure 2:
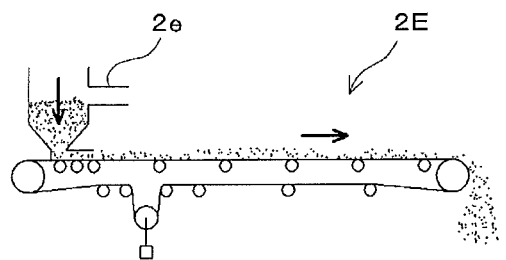

The redundant powdery material conveying unit 2 may have any one of the various specific configurations shown in FIGS. 2(a) to 2(e). FIG. 2(a) shows a screw conveyer 2A, FIG. 2(b) shows a screw feeder 2B, FIG. 2(c) shows a vibratory conveying unit 2C, FIG. 2(d) shows a skip hoist 2D, and FIG. 2(e) shows a conveying unit belt 2E.

The structures shown in FIGS. 2(a) to 2(c) each have a tube-like shape. The structure shown in FIG. 2(c) may alternatively have a gutter shape or a conveying unit. FIG. 2(a) shows a spiral conveying machine having the tube-like structure and a screw located therein. The redundant powdery material conveying units 2A to 2E may be optionally provided with overflown powdery material dischargers 2a to 2e, respectively.

The redundant (i.e., excess or waste) powdery material conveying unit 2 according to an embodiment including a vertical or inclined conveyance of a redundant powdery material is advantageously located in the vertical direction or in an inclined direction because such location decreases a planar occupancy area and enables reduction in size of the device. Furthermore, the redundant powdery material recovering unit 1, which executes the step prior to that of the redundant powdery material conveying unit 2, collects the redundant powdery material on the rotating die table, and the rotating die table is provided with the series of continuous structures from the new powdery molding material supplying unit 6, to the pre-mixed powdery material reserving unit 3, the powdery material mixing unit 4, and then the powdery material filling unit 5. The redundant powdery material conveying unit 2 is thus preferred to occupy not much of the upper surface of the rotating die table, more specifically, to collect the redundant powdery material to the outside of the rotating die table.

The redundant powdery material conveying unit 2 is preferred to not occupy a large space. The redundant powdery material conveying unit 2 may convey the redundant powdery material in the horizontal direction, more preferably conveys in an inclined direction, and most preferably conveys in the vertical direction.

The pre-mixed powdery material reserving unit 3 is not particularly limited in terms of its configuration, shape, and the like, as long as it is a structure capable of reserving a powdery material. The new powdery molding material N supplied from the new powdery molding material supplying unit 6 and the redundant powdery material R conveyed by the redundant powdery material conveying unit 2 join together and are temporarily reserved in the pre-mixed powdery material reserving unit 3. The constant conveyance amount of the redundant powdery material R is conveyed, and a constant conveyance amount of the new powdery molding material N is supplied from the new powdery molding material supplying unit 6. Accordingly, the pre-mixed powdery material reserving unit 3 reserves the new powdery molding material N and the redundant powdery material R at a substantially constant ratio. The new powdery molding material N and the redundant powdery material R joined therein are mixed by the subsequent powdery material mixing unit 4 so as to be substantially uniform.

As the new powdery molding material supplying unit 6, a powdery material supply device included in an ordinary rotary compression molding machine can be applied with no modification. The new powdery molding material N thus batch fed is generally transferred due to gravity force and is received by the pre-mixed powdery material reserving unit 3. The transfer amount of the new powdery molding material N can be regulated simply in accordance with a well known technique employed in an ordinary powdery material supply device. More specifically, the new powdery molding material supplying unit 6 is provided with a device for controlling a supply amount of a powdery material so that the device regulates the transfer amount of the new powdery molding material N.

For example, it is possible to regulate the supply speed of the powdery material by manually regulating the size of an opening itself to the pre-mixed powdery material reserving unit 3 or regulating the size of the opening using a manual choke valve, so that the powdery material drops at a constant speed.

According to a different aspect, the supply amount of the new powdery molding material N can be fixed using a powdery material sensor. For example, a powdery material level sensor 7 for constantly controlling the amount of a powdery material supplied from the new powdery molding material supplying unit 6 is located at one of the pre-mixed powdery material reserving unit 3, the powdery material mixing unit 4, and the powdery material filling unit 5. Depending on the type of the sensor, the powdery material level sensor 7 senses height or density of the powdery material and controls the supply amount of the new powdery molding material N on the basis of such data. For example, a butterfly valve or a choke valve regulated by a motor controls and fixes the amount of the new powdery molding material N supplied to the pre-mixed powdery material reserving unit 3. A sensor configured to sense height of a powdery material is preferably located at the pre-mixed powdery material reserving unit 3, whereas a sensor configured to sense density can be located at any of the locations mentioned above.

Figure 3:
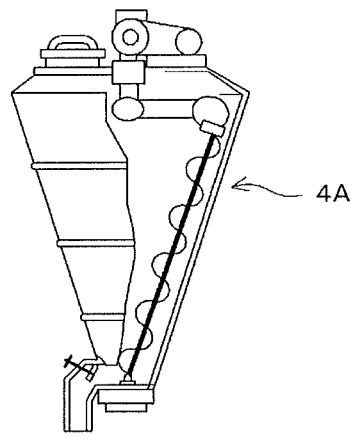
FIGS. 3(a) to 3(e) are views exemplifying powdery material mixing units according to various aspects of the invention.
Figure 3:
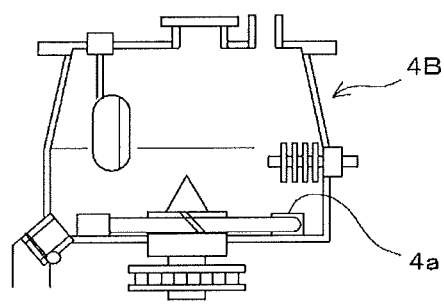
Figure 3:
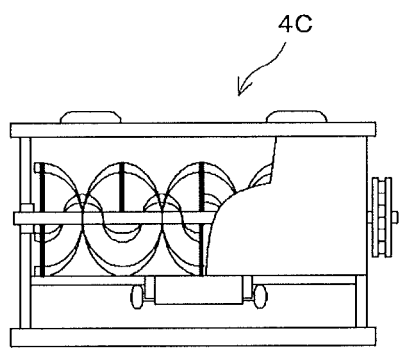
Figure 3:
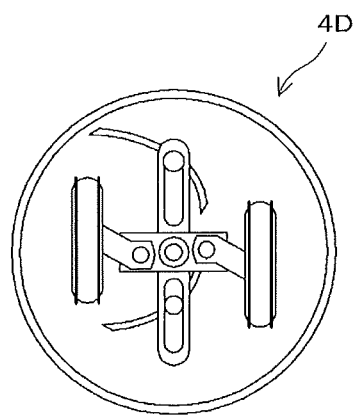
Figure 3:
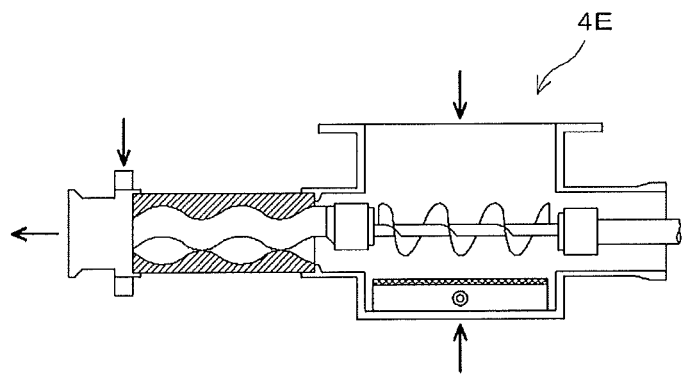

The powdery material mixing unit 4, which mixes the new powdery molding material N and the redundant powdery material R transferred from the pre-mixed powdery material reserving unit 3, has only to mix and substantially homogenize the powdery materials. FIGS. 3(*a*) to 3(*e*) each show a specific configuration of the powdery material mixing unit 4. The powdery material mixing unit 4 may be provided as a screw mixing unit 4A shown in FIG. 3(*a*), a flash mixing unit 4B including a rotary blade 4a shown in FIG. 3(*b*), a ribbon blender 4C shown in FIG. 3(*c*), a muller 4D shown in FIG. 3(*d*), or a kneader 4E shown in FIG. 3(*e*).

The powdery material mixing unit 4 is not limited to these configurations, but may be a unit obtained by combination of any of these configurations, by simplification, by reduction in size, or the like. Among these, the powdery material mixing unit 4 preferably includes the rotary blade 4a for agitating a powdery material as the flash mixing unit 4B shown in FIG. 3(*b*). The pre-mixed powdery material reserving unit 3 and the powdery material mixing unit 4 may be alternatively configured integrally, in which case the filling device is further reduced in size.

The powdery material filling unit 5 fills the dies with the mixed powdery material M, and can be simply provided as an ordinary feeder. More specifically, the powdery material filling unit 5 may be provided as a feeder that has a rotary blade (similar to the rotary blade 4a shown in FIG. 3(*b*), for example) or a ladder-like stepped portion 5a (see FIG. 5).

Still alternatively, the powdery material mixing unit 4 and the powdery material filling unit 5 can be configured integrally by improving the powdery material filling unit 5 on the basis of the powdery material mixing unit 4 according to each of the aspects so that the new powdery material N and the recovered redundant powdery material R can be filled while being mixed together and substantially homogenized. In this case, it is obviously required to fill the new powdery material N and the recovered redundant powdery material R while being mixed and substantially homogenized. The powdery material mixing unit 4 and the powdery material filling unit 5 being configured integrally lead to further reduction in size of the filling device. The pre-mixed powdery material reserving unit 3, the powdery material mixing unit 4, and the powdery material filling unit 5 can be alternatively configured integrally together, in which case the filling device is still further reduced in size.

Figure 4:
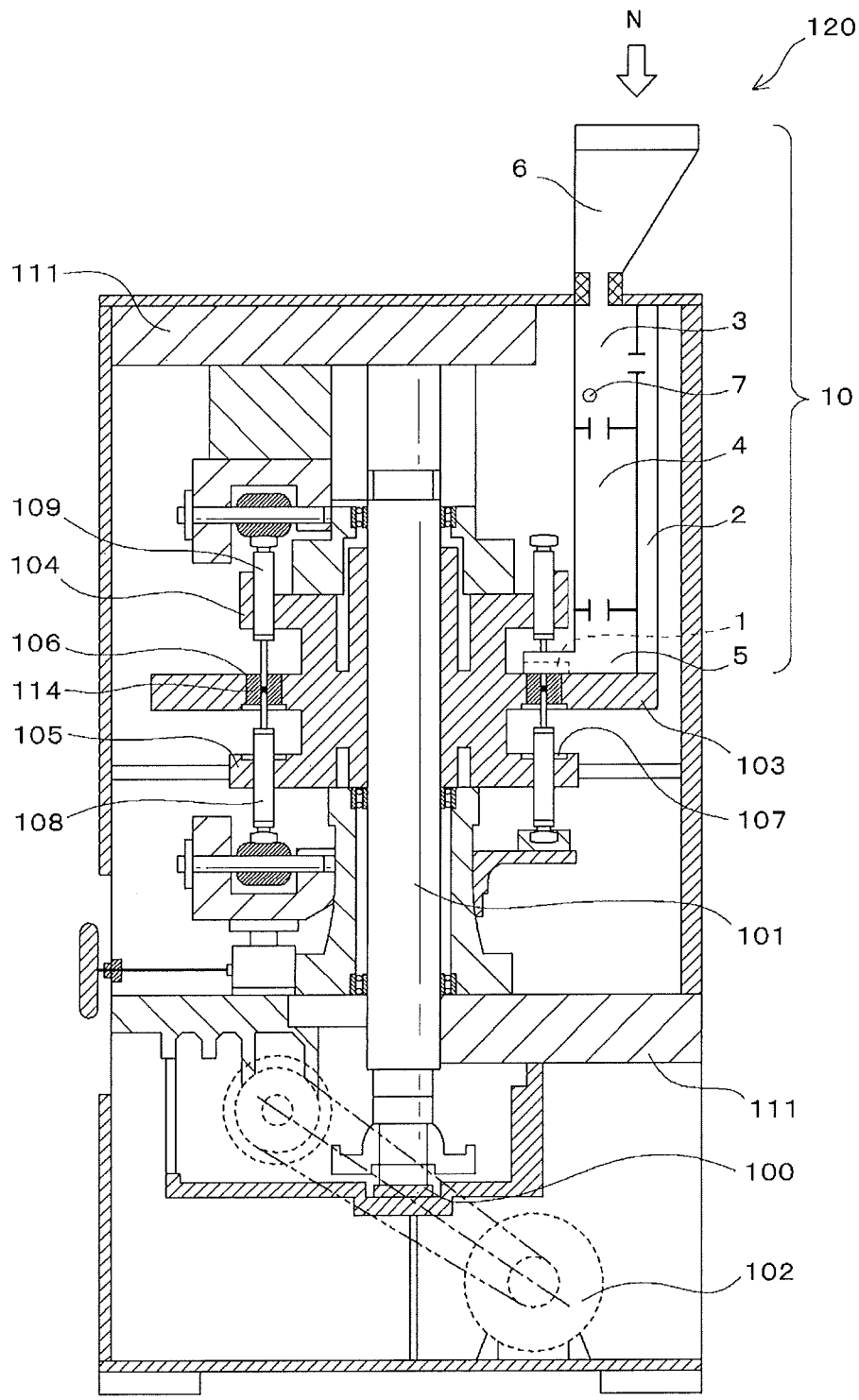
FIG. 4 is a sectional view of a rotary compression molding machine having the powdery material filling device provided with the redundant powdery material recovering mechanism according to certain aspects of the invention.

In a case where a rotary compression molding machine 120 is driven with a shaft as shown in FIG. 4, an upright shaft 101 pivotally supported by a bearing 100 is provided at the center of a main body frame 111, a motor 102 transmits rotary driving power to the upright shaft 101, and the rotating die table 103 having two divisional functional portions is fixed near the upright shaft. The machine 120 further includes an upper punch retainer 104 located above the rotating die table 103 and a lower punch retainer 105 located below the rotating die table 103 so that the upper punch retainer 104 and the lower punch retainer 105 sandwich the rotating die table 103. The upper punch retainer 104 retains upper punches 109 so as to be vertically slidable, whereas the lower punch retainer 105 retains lower punches 108 so as to be vertically slidable. The rotating die table 103 is provided with a die portion having a plurality of die attachment holes 106 that are aligned on an identical circumference and allow dies 114 to be detachably fitted therein. The upper punch retainer 104 and the lower punch retainer 105 are provided with a plurality of punch retaining holes 107 that slidably retain the upper punches 109 and the lower punches 108, respectively.

FIG. 4 also shows conceptually but more specifically the powdery material filling device 10 provided with the redundant (i.e., excess or waste) powdery material recovering mechanism according to the invention. In the filling device 10, the new powdery molding material supplying unit 6, the pre-mixed powdery material reserving unit 3, the powdery material mixing unit 4, and the powdery material filling unit 5 may be located in this order from the top. In this case, the new powdery molding material N, the recovered redundant powdery material R, or the mixed powdery material M sequentially flows downward due to gravity force. This allows the configuration of the device to be reasonable and facilitated. The redundant powdery material conveying unit 2 is preferably located outside the rotating die table 103 so that the redundant powdery material recovering unit 1 recovers the redundant powdery material R to the outside of the rotating die table 103.

Figure 5:
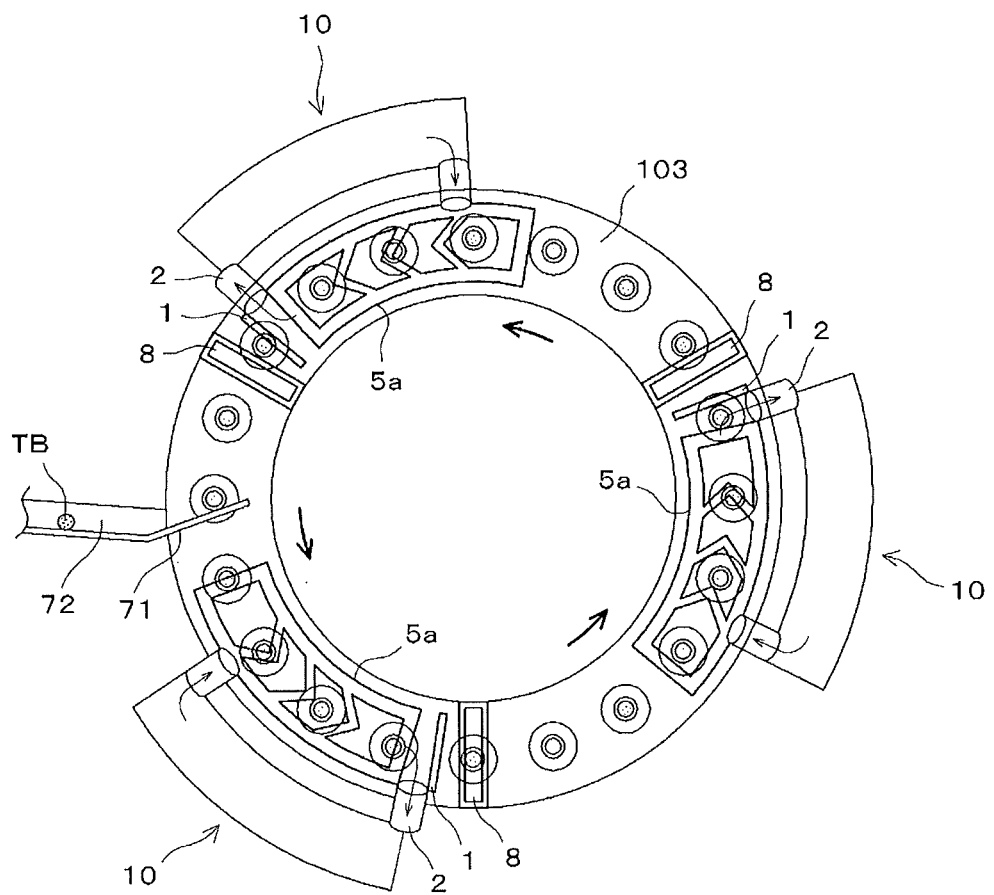
FIG. 5 is a top view of a rotating die table and its periphery of the rotary compression molding machine having the powdery material filling devices each provided with the redundant powdery material recovering mechanism according to the invention as shown in FIG. 4.

FIG. 5 is a top view of the upper surface of the rotating die table of the rotary compression molding machine 120 having the filling devices 10 each provided with the redundant (i.e., excess or waste) powdery material recovering mechanism according to the invention, the view being conceptual but more specific. This figure depicts the devices described herein and exemplary locations around the rotating die table 103. The dust collectors 8 of the air supply and suction type and the ladder-like stepped portions 5a are configured as described earlier. Reference sign 71 denotes a scraper for guiding tableted bodies TB to a chute 72.

As described above, the device according to the invention is capable of actively recovering and reusing a redundant powdery material that has not been typically recovered in a conventional device, even upon production of multi-layer tablets in each of which powdery materials in different layers must not be mixed. Such a redundant powdery material that has not been conventionally recovered but has been disposed occupies 20% to 40% of a newly supplied powdery material, whereas the device according to the invention is capable of recovering and refilling at least about 90% of a redundant powdery material.

Furthermore, the redundant powdery material is different in precise physical properties such as composition, particle size, and component distribution, from the powdery material due to external influence while the redundant powdery material is once leaked out of the filling device and the dies onto the rotating die table, is recovered, and is conveyed. The device according to the invention is capable of keeping the ratio in amount of the redundant powdery material to be recovered and reused to the new redundant powdery material so as to be substantially constant. It is thus possible to produce molded products from a powdery molding material always having constant physical properties. This is quite important for producing products of high quality with extremely small variation among the molded products. The device according to the invention exerts these effects also upon production of molded products from a powdery molding material of a single type.

INDUSTRIAL APPLICABILITY

The powdery material filling device provided with the redundant (i.e., excess or waste) powdery material recovering mechanism and the rotary compression molding machine according to the invention are obviously applicable to a field of producing molded products by compressing and molding a powdery material of a single type, as well as are particularly valuable in a field of producing molded products by compressing and molding powdery materials of a plurality of types. The invention is thus applicable to a field of producing molded products in each of which a plurality of types of powdery materials are layered, or molded products in each of which a plurality of types of powdery materials are layered partially, such as the medical field or the metallurgical field including the field of producing molded products by burning a powdery material.

The invention claimed is:

1. A powdery material filling device having an excess powdery material recovering mechanism in a rotary compression molding machine having a rotating die table provided with a plurality of dies, and upper punches and lower punches located above and below the dies respectively, wherein the dies are configured to be filled with powdery material and then the upper punches and the lower punches are configured to sequentially compress and mold the filled powdery material in the dies, while the dies, the upper punches, and the lower punches are rotated along with the rotating die table, the device comprising:
   a powdery material filling unit configured to fill the dies with powdery material;
   an excess powdery material recovering unit positioned downstream of the powdery material filling unit, the excess powdery material recovering unit configured for separating and recovering, from a surface of the rotating die table, excess powdery material leaked out of the powdery material filling unit and the dies onto the rotating die table;
   an excess powdery material conveying unit configured to convey excess powdery material recovered by the excess powdery material recovering unit quasi-continuously in a predetermined constant amount of conveyance per unit time, wherein the amount of conveyance per unit time can be regulated;
   a new powdery molding material supplying unit configured to supply the powdery material filling device with new powdery molding material;
   a pre-mixed powdery material reserving unit connected to the new powdery molding material supplying unit and the excess powdery material conveying unit, the pre-mixed powdery material reserving unit configured to temporarily reserve the new powdery molding material supplied from the new powdery molding material supplying unit and the excess powdery material conveyed by the excess powdery material conveying unit; and
   a powdery material mixing unit configured for mixing and substantially homogenizing the new powdery molding material and the excess powdery material transferred from the pre-mixed powdery material reserving unit, wherein:
   the powdery material filling unit is configured to fill the dies with the powdery material that is mixed and substantially homogenized in the powdery material mixing unit, the powdery material having a substantially constant ratio between the new powdery material and the excess powdery material.

2. The powdery material filling device provided with the excess powdery material recovering mechanism according to claim 1, wherein at least one of the excess powdery material recovering unit and the excess powdery material conveying unit has an overflown powdery material discharger configured to discharge an overflown excess powdery material from the device.

3. The powdery material filling device provided with the excess powdery material recovering mechanism according to claim 1, wherein the excess powdery material conveying unit is located outside the rotating die table.

4. The powdery material filling device provided with the excess powdery material recovering mechanism according to claim 1, wherein the excess powdery material conveying unit has a tube-like structure or a gutter-like structure.

5. The powdery material filling device provided with the excess powdery material recovering mechanism according to claim 1, wherein the excess powdery material conveying unit is a conveyer or a spiral conveying machine having a screw in a tube-like structure.

6. The powdery material filling device provided with the excess powdery material recovering mechanism according to claim 1, wherein the new powdery molding material supplying unit, the pre-mixed powdery material reserving unit, the powdery material mixing unit, and the powdery material filling unit are located in this order vertically from top to bottom in the powdery filling device.

7. The powdery material filling device provided with the excess powdery material recovering mechanism according to claim 1, wherein the powdery material mixing unit and the powdery material filling unit are configured integrally.

8. The powdery material filling device provided with the excess powdery material recovering mechanism according to claim 1, wherein the pre-mixed powdery material reserving unit and the powdery material mixing unit are configured integrally.

9. The powdery material filling device provided with the excess powdery material recovering mechanism according to claim 1, wherein the powdery material mixing unit has a rotary blade for agitating the powdery material.

10. The powdery material filling device provided with the excess powdery material recovering mechanism according to claim 1, wherein the powdery material filling unit has a rotary blade or a ladder-like stepped portion.

11. The powdery material filling device provided with the excess powdery material recovering mechanism according to claim 1, wherein the excess powdery material recovering unit is a scraper made of material having hardness less than that of the rotating die table.

12. The powdery material filling device provided with the excess powdery material recovering mechanism according to claim 1, wherein at least one of the pre-mixed powdery material reserving unit, the powdery material mixing unit, and the powdery material filling unit includes a powdery material level sensor for constantly controlling an amount of the new powdery molding material supplied from the new powdery molding material supplying unit.

13. The powdery material filling device provided with the excess powdery material recovering mechanism according to claim 1, wherein the amount of conveyance per unit time by the excess powdery material conveying unit is set in accordance with an amount of the excess powdery material recovered by the excess powdery material recovering unit.

* * * * *